(12) United States Patent
Byon

(10) Patent No.: US 8,351,318 B2
(45) Date of Patent: Jan. 8, 2013

(54) METHOD AND APPARATUS FOR CONVERGING VOLTAGES OF OPTICAL RECORDING MEDIUM

(75) Inventor: Sang-woog Byon, Namyangju-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 889 days.

(21) Appl. No.: 12/010,591

(22) Filed: Jan. 28, 2008

(65) Prior Publication Data

US 2008/0232227 A1 Sep. 25, 2008

(30) Foreign Application Priority Data

Mar. 19, 2007 (KR) .................. 10-2007-0026803

(51) Int. Cl.
*G11B 7/00* (2006.01)
(52) U.S. Cl. .................................. 369/124.01
(58) Field of Classification Search .................. None
See application file for complete search history.

(56) References Cited

U.S. PATENT DOCUMENTS

| 7,236,014 B1 * | 6/2007 | McQuirk et al. ........... 327/58 |
| 2005/0073932 A1 * | 4/2005 | Shihara et al. ........... 369/59.21 |
| 2005/0117502 A1 * | 6/2005 | Kanda ........... 369/124.11 |

FOREIGN PATENT DOCUMENTS

| CN | 1241770 A | 1/2000 |
| CN | 1478277 | 2/2004 |
| CN | 1624777 | 6/2005 |
| JP | 61-247116 | 11/1986 |
| KR | 10-2003-0093815 | 11/2003 |

OTHER PUBLICATIONS

First Office Action issued on Apr. 7, 2011 by Chinese Patent Office for Chinese patent application No. 200810087202.9.
Office Action dated Jun. 27, 2012 for corresponding Chinese Patent Application No. 200810087202.9.

\* cited by examiner

*Primary Examiner* — Hoa T Nguyen
*Assistant Examiner* — Emily Frank
(74) *Attorney, Agent, or Firm* — Harness, Dickey & Pierce, P.L.C.

(57) ABSTRACT

An apparatus for converging voltages of an optical recording medium may include a first converging unit, a second converging unit, and/or a switching unit. The first converging unit may be configured to converge a voltage level of a first input signal to a reference voltage. The second converging unit may be configured to converge a voltage level of a second input signal to the reference voltage. The switching unit may be configured to determine whether to short-circuit output terminals of the first and second converging units during a period when the voltage levels of the first and second input signals are being converged to the reference voltage.

20 Claims, 5 Drawing Sheets

METHOD AND APPARATUS FOR CONVERGING VOLTAGES OF OPTICAL RECORDING MEDIUM

PRIORITY STATEMENT

This application claims the benefit of priority to Korean Patent Application No. 10-2007-0026803, filed on Mar. 19, 2007, in the Korean Intellectual Property Office, the entire contents of which are incorporated herein in their entirety by reference.

BACKGROUND

1. Field

Example embodiments relate to an optical recording medium, and for example, to a method and apparatus for converging voltage levels of a plurality of input signals of an optical recording medium to a reference voltage.

2. Description of Related Art

For discs, e.g., compact discs (CDs), and magneto-optical discs that may be recorded on an optical recording medium, a recording area is generally divided according to a specific basic recording unit in order to perform a recording operation in a specific unit. An optical pick-up unit may need to exactly find a physically divided area that is the basic recording unit at a high speed without causing an error in order to write or read data onto or from the physically divided area. The optical recording medium changes a DC voltage level of an input signal, while the optical pick-up unit operates, to a reference voltage for the inside of the optical recording medium. A high pass filter (HPF) is generally used to change the DC voltage level of the signal to the reference voltage.

FIG. 1 is a circuit diagram of a conventional HPF 100. Referring to FIG. 1, the conventional HPF 100 uses a resistor R and a capacitor C. A reference voltage Vref may be applied to one of the resistor R. If a time function, which is a signal, e.g., x(t), is input to an input end INPUT of the HPF 100 and another time function y(t) is output from an output end OUTPUT of the HPF 100 in response to x(t), a transfer function H(s) of the HPF 100 is expressed by Equation 1 as is well known to those of ordinary skill in the art.

$$H(s) = \frac{Y(s)}{X(s)} = \frac{sRC}{1+sRC} \quad (1)$$

A cutoff frequency fc indicated in Equation 1 is expressed by Equation 2 as is also well known to those of ordinary skill in the art.

$$f_c = \frac{1}{2\pi RC} \quad (2)$$

FIG. 2 is an example graph representing the transfer function H(s) of the HPF 100 illustrated in FIG. 1. Referring to FIG. 2, the graph showing the transfer function H(s) indicates that the input signal is not transmitted in an area of frequencies lower than the cutoff frequency fc, whereas the input signal is transmitted from the output end OUTPUT of the HPF 100 without loss in an area of frequencies higher than the cutoff frequency fc.

If a DC voltage level of the input signal is changed to a reference voltage of an optical recording medium, the DC voltage level of the input signal does not quickly change due to response speed characteristics of the fixed cutoff frequency fc of the conventional HPF 100. In order to address this problem, a method of changing the cutoff frequency fc of the conventional HPF 100 to be higher by designing a variable cutoff frequency fc to have faster response speed characteristics has been suggested. However, the method uses several cutoff frequencies fc, which causes an increase in chip size. Furthermore, the higher cutoff frequency fc reduces a resistance of the resistor R of the conventional HPF 100, which makes driving a current more difficult. The size of the capacitor C of the HPF 100 needs to be reduced in order to increase the resistance of the resistor R of the HPF 100.

SUMMARY

Example embodiments provide an apparatus for converging voltages of an optical recording medium that more quickly converges DC voltage levels of input signals to a desired reference voltage without increasing chip size and/or without increasing a difficulty of driving a current.

Example embodiments provide a voltage converging method using the apparatus for converging the voltages of the optical recording medium.

According to an example embodiment, an apparatus for converging voltages of an optical recording medium may include a first converging unit, a second converging unit, and/or a switching unit. The first converging unit may be configured to converge a voltage level of a first input signal to a reference voltage. The second converging unit may be configured to converge a voltage level of a second input signal to the reference voltage. The switching unit may be configured to determine whether to short-circuit output terminals of the first and second converging units during a period when the voltage levels of the first and second input signals are being converged to the reference voltage.

According to an example embodiment, the switching unit may be configured to determine whether to short-circuit the output terminals in response to a header signal of the optical recording medium.

According to an example embodiment, the switching unit may be configured to short-circuit the output terminals of the first and second converging units if the header signal is enabled.

According to an example embodiment, the header signal may be a variable frequency oscillator (VFO) signal.

According to an example embodiment, the first converging unit may be configured to converge the voltage level of the first input signal from among a plurality of input signals to the reference voltage, and/or the second converging unit may be configured to converge the voltage level of the second input signal from among the plurality of input signals to the reference voltage.

According to an example embodiment, before the voltage levels of the first and second input signals are converged to the reference voltage, a difference value between the voltage level of the first input signal and the reference voltage may have an opposite polarity to and has the same magnitude as a difference value between the voltage level of the second input signal and the reference voltage.

According to an example embodiment, the first converging unit may include a first capacitive element and/or a first resistive element. The first capacitive element may have a first end to which the first input signal is applied and a second end to which the output terminal of the first converging unit is connected. The first resistive element may have a first end to which the reference voltage is applied and a second end to which the second end of the first capacitive element and the output terminal of the first converging unit are connected.

According to an example embodiment, the second converging unit may include a second capacitive element and/or a second resistive element. The second capacitive element may have a first end to which the second input signal is applied and a second end to which the output terminal of the second converging unit is connected. The second resistive element may have a first end to which the reference voltage is applied and a second end to which the second end of the second capacitive element and the output terminal of the second converging unit are connected.

According to an example embodiment, the switching unit may be a switch.

According to an example embodiment, the voltage levels of the first and second input signals may be DC voltage levels.

According to an example embodiment, the first and second converging units may be high pass filters (HPFs).

According to an example embodiment, a method of converging voltage levels of a plurality of input signals of an optical recording medium may include converging voltage levels of a first input signal and a second input signal from among the plurality of input signals to a reference voltage and determining if a header signal of the optical recording medium is enabled. If the header signal of the optical recording medium is enabled, a first node and a second node configured to output the first and second input signals may be short-circuited.

According to an example embodiment, if the header signal is disabled, the first and second nodes may be open.

According to an example embodiment, the header signal may be a variable frequency oscillator (VFO) signal.

According to an example embodiment, before converging the voltage levels of the first and second input signals to the reference voltage, a difference value between the voltage level of the first input signal and the reference voltage may have an opposite polarity to and has the same magnitude as a difference value between the voltage level of the second input signal and the reference voltage.

According to an example embodiment, the voltage levels of the first and second input signals may be DC voltage levels.

According to an example embodiment, a method of converging voltage levels of a plurality of input signals of an optical recording medium may include converging voltage levels of a first input signal and a second input signal from among the plurality of input signals to a reference voltage and determining a converging period during which the voltage levels of the first and second input signals are converging to the reference voltage. If a current period is the converging period, a first node and a second node configured to output the first and second input signals may be short-circuited.

According to an example embodiment, if the current period is not the converging period, the first and second nodes may be open.

BRIEF DESCRIPTION OF THE DRAWINGS

The above and/or other aspects and advantages will become more apparent and more readily appreciated from the following detailed description of example embodiments taken in conjunction with the accompanying drawings of which.

DETAILED DESCRIPTION OF EXAMPLE EMBODIMENTS

Figure 1:
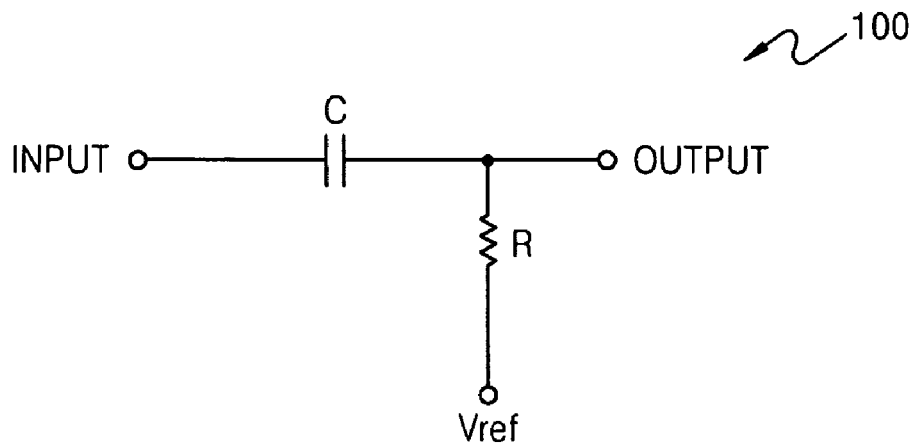
FIG. 1 is a circuit diagram of a conventional high pass filter (HPF)
Figure 2:
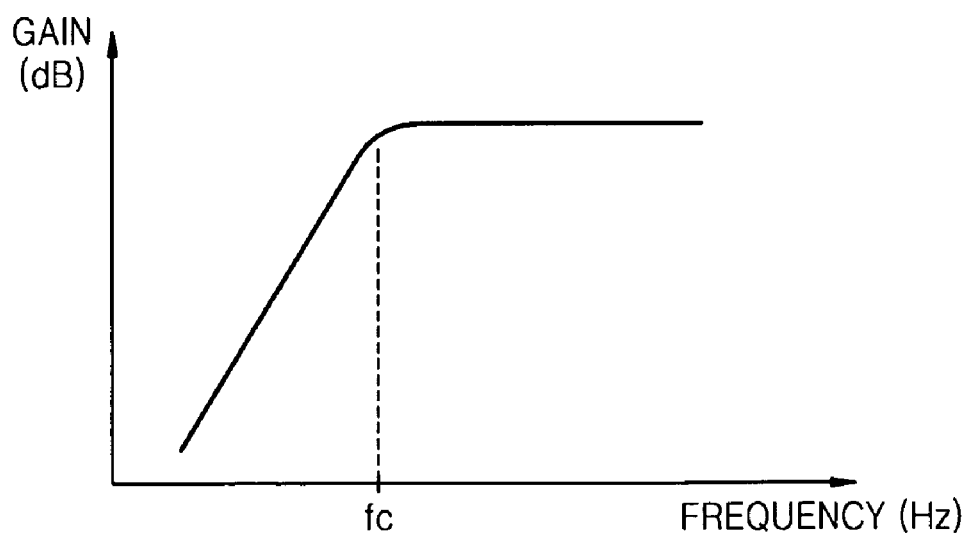
FIG. 2 is an example graph representing a transfer function of the conventional HPF illustrated in FIG. 1.

Example embodiments will now be described more fully hereinafter with reference to the accompanying drawings. Embodiments may, however, be in many different forms and should not be construed as being limited to the example embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when a component is referred to as being "on," "connected to" or "coupled to" another component, it can be directly on, connected to or coupled to the other component or intervening components may be present. In contrast, when a component is referred to as being "directly on," "directly connected to" or "directly coupled to" another component, there are no intervening components present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the example embodiments.

Spatially relative terms, such as "beneath," "below," "lower," "above," "upper" and the like, may be used herein for ease of description to describe one component or feature's relationship to another component(s) or feature(s) as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Reference will now be made to example embodiments, which are illustrated in the accompanying drawings, wherein like reference numerals refer to the like components throughout.

Figure 3:
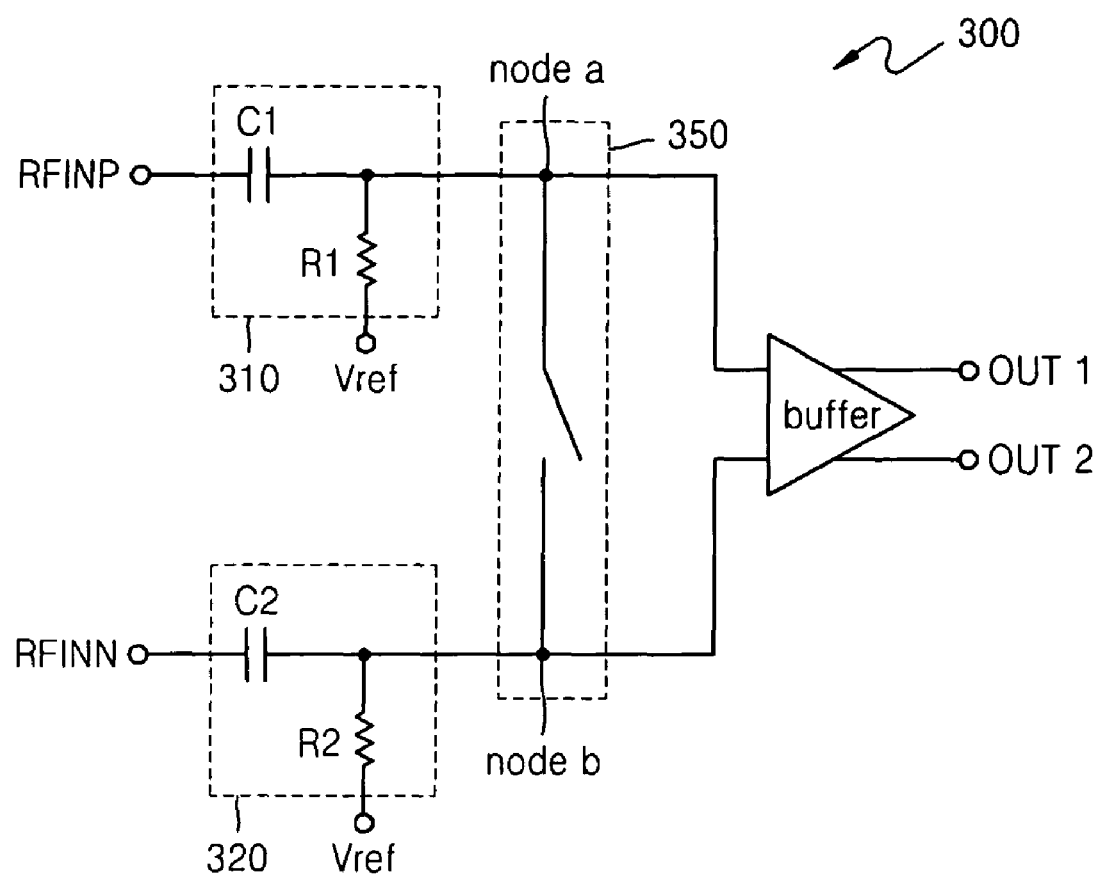
FIG. 3 is a circuit diagram of an apparatus for converging a voltage of an optical recording medium according to an example embodiment.

FIG. 3 is a circuit diagram of an apparatus 300 for converging a voltage of an optical recording medium according to an example embodiment. Referring to FIG. 3, the apparatus 300 for converging the voltage of the optical recording medium may include a first converging unit 310, a second converging unit 320, and/or a switching unit 350.

The first converging unit 310 may converge a voltage level of a first input signal RFINP to a reference voltage Vref. The second converging unit 320 may converge a voltage level of a second input signal RFINN to the reference voltage Vref. For example, the first converging unit 310 and the second converging unit 320 may converge each DC voltage level of their respective input signals RFINP and RFINN to the reference voltage Vref. The apparatus 300 for converging the voltage may receive two input signals RFINP and RFINN from among a plurality of input signals and separately converge both input signals RFINP and RFINN.

The first converging unit 310 may include a resistive element R1 and a capacitive element C1, and the second converging unit 320 may include a resistive element R2 and a capacitive element C2. For example, the first converging unit 310 may include the capacitor C1 having a first end to which the first input signal RFINP is applied and a second end to which an output terminal of the first converging unit 310 is connected, and/or the first converging unit 310 may include the resistor R1 having a first end to which the reference voltage Vref is applied and a second end to which the second end of the capacitor C1 and the output terminal of the first converging unit 310 are connected. The second converging unit 320 may include the capacitor C2 having a first end to which the second input signal RFINN is applied and a second end to which an output terminal of the second converging unit 320 is connected, and/or the second converging unit 320 may include the resistor R2 having a first end to which the reference voltage Vref is applied and a second end to which the second end of the capacitor C2 and the output terminal of the second converging unit 320 are connected.

The switching unit 350 may short-circuit the first converging unit 310 and the second converging unit 320 during a period when the voltage levels of the first and second input signals RFINP and RFINN are converging to the reference voltage Vref. For example, the switching unit 350 may short-circuit a first node a that is the output terminal of the first converging unit 310 and a second node b that is the output terminal of the second converging unit 320, so that the voltage levels of the first and second input signals RFINP and RFINN more rapidly converge to the reference voltage Vref.

The switching unit 350 may determine whether to short-circuit the output terminals of the first converging unit 310 and the second converging unit 320 during the period when the voltage levels of the first and second input signals RFINP and RFINN are converging to the reference voltage Vref in response to a header signal of the optical recording medium. For example, if the switching unit 350 is realized as a switch as illustrated in FIG. 3, the switch may be closed if the header signal is enabled so that the output terminals of the first converging unit 310 and the second converging unit 320 are short-circuited. However, example embodiments are not limited to the switching unit 350, and it will be obvious to one of ordinary skill in the art that a different element may produce the same effect as that of example embodiments if the output terminals of the first converging unit 310 and the second converging unit 320 may be short-circuited.

A DVD-RAM, which is one type of optical recording media, may include a groove track and a land track each being divided into a specific number of sectors, each sector having a header including four addresses. A 2.6 or 4.7 GB DVD-RAM may include 128-byte header information per sector. The header information may be recorded by a pre-pit if a disc substrate is manufactured, and/or may include a variable frequency oscillator (VFO) area for a phase locked loop (PLL), a physical identification data (PID) area to which a sector number is allocated, an ID error detection (IED) area storing ID error detection information, or the like. The header area may be disposed at the forefront of a sector and/or an optical pick-up unit may perform addressing to a desired location, a sector number, and/or a sector type. Whether a track to which the sector belongs is the groove track or the land track may be determined and/or servo control may be performed.

The apparatus 300 for converging the voltage of the optical recording medium according to an example embodiment may determine whether to short-circuit the first and second converging units 310 and 320 in response to a VFO signal distinguishing the VFO area from among the header areas.

The input signals RFINP and RFINN, whose voltage levels are converged to the reference voltage Vref according to each operation of the first converging unit 310, the second converging unit 320, and the switching unit 350, may be output to the output terminals OUT 1 and OUT 2. For example, the input signals RFINP and RFINN, whose voltage levels are converged to the reference voltage Vref according to each operation of the first converging unit 310, the second converging unit 320, and the switching unit 350, may be buffered by a buffer before being output to the output terminals OUT 1 and OUT 2.

Figure 4A:
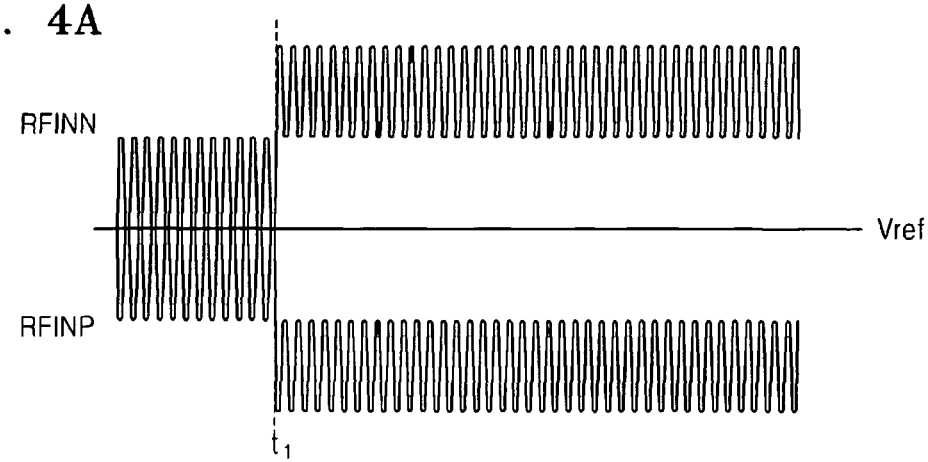
FIG. 4A is an example waveform illustrating the input signals RFINP and RFINN of the optical recording medium illustrated in FIG. 3.
Figure 4B:
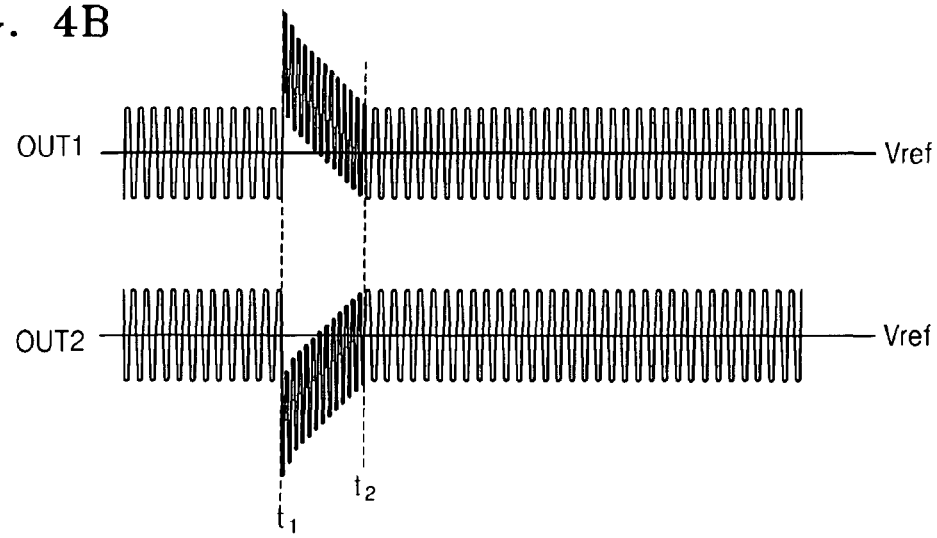
FIG. 4B is an example waveform illustrating conventional output signals OUT1 and OUT2.
Figure 4C:
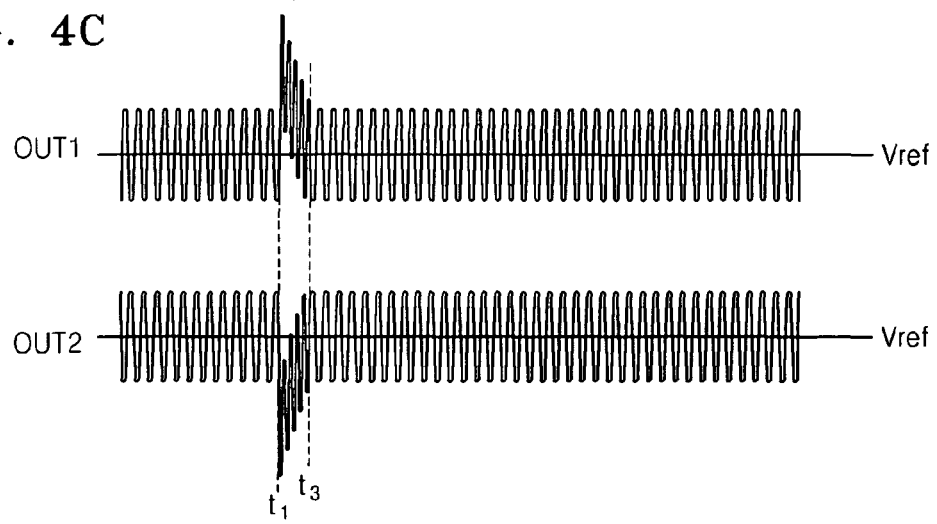
FIG. 4C is an example waveform illustrating output signals OUT1 and OUT2 according to the apparatus for converging the voltage of the optical recording medium illustrated in FIG. 3.

FIGS. 4A, 4B, and 4C are example waveforms illustrating the input/output signals of the apparatus 300 for converging the voltage of the optical recording medium illustrated in FIG. 3.

FIG. 4A is an example waveform illustrating the input signals RFINP and RFINN of the optical recording medium. FIG. 4B is an example waveform illustrating conventional output signals OUT1 and OUT2. FIG. 4C is an example waveform illustrating output signals OUT1 and OUT2 according to the apparatus 300 for converging the voltage of the optical recording medium illustrated in FIG. 3.

Referring to FIG. 4A, the input signals RFINP and RFINN may be input by time t1, and the DC voltage levels of the input signals RFINP and RFINN may increase after time t1. A difference value between the DC voltage level of the first input signal RFINP and the reference voltage Vref may have an opposite polarity to and have the same magnitude as that between the DC voltage level of the second input signal RFINN and the reference voltage Vref.

Referring to FIG. 4B, if the DC voltage levels of the input signals RFINP and RFINN increase after time t1, each of the conventional output signals OUT1 and OUT2 may be completely converged to the reference voltage Vref even after time t2.

However, referring to FIGS. 3 and 4C, each of the output signals OUT1 and OUT2 of the apparatus 300 for converging the voltage according to an example embodiment may be completely converged to the reference voltage Vref at time t3. For example, time t3 may be before time t2. For example, the output terminals of the first and second converging units 310 and 320 may be short-circuited in response to the header signal at time t1. Therefore, the DC voltage levels of the input signals RFINP and RFINN may more rapidly converge to the reference voltage Vref after time t1. The input signals RFINP and RFINN may converge to the reference voltage Vref at a much faster speed by using the apparatus 300 for converging the voltage according to an example embodiment as compared to the conventional art.

Figure 5:
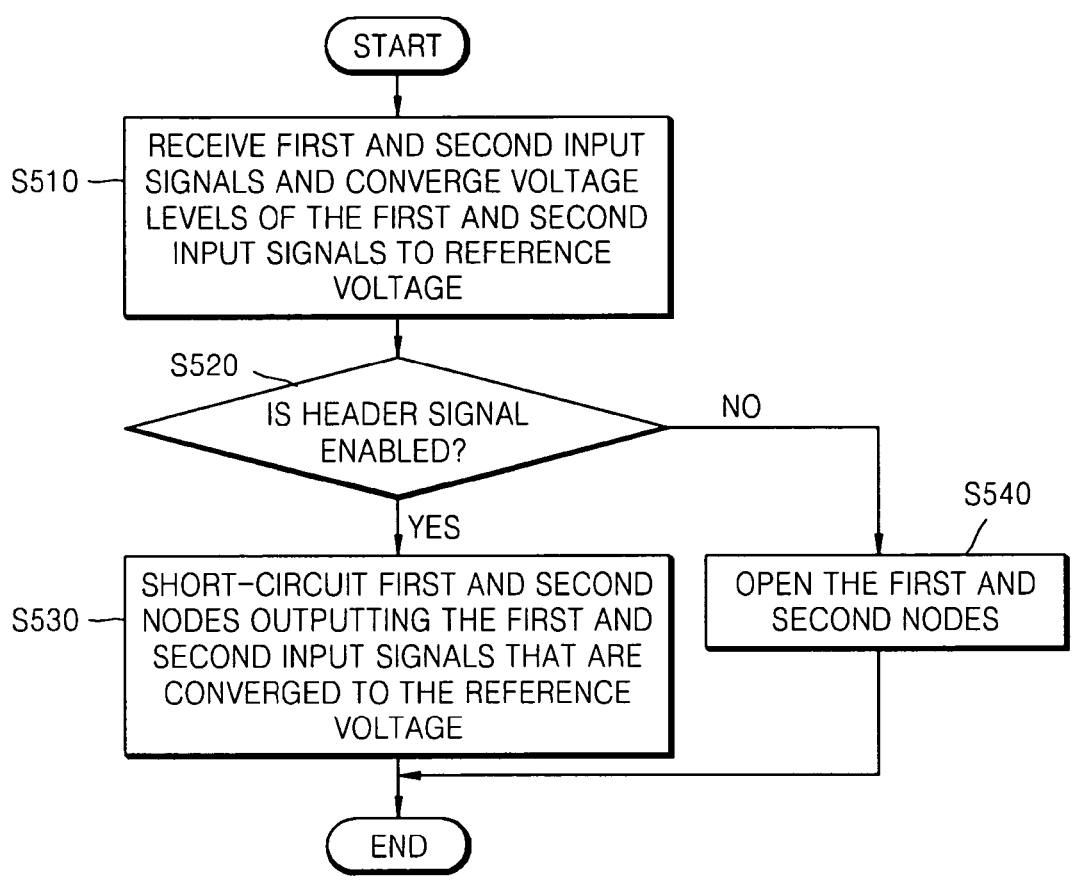
FIG. 5 is a flowchart of a method of converging a voltage of an optical recording medium according to an example embodiment.

FIG. 5 is a flowchart of a method of converging a voltage of an optical recording medium according to an example embodiment. Referring to FIGS. 3 through 5, the apparatus 300 for converging the voltage of the optical recording medium may receive the first and second input signals RFINP and RFINN and converge voltage levels of the first and second input signals RFINP and RFINN to the reference voltage Vref (S510). During the converging of the first and second input signals RFINP and RFINN, e.g., during the operation (S510), the apparatus 300 for converging the voltage of the optical recording medium may determine if the header signal is enabled (S520). If the header signal is enabled, the first and second nodes a and b that output the first and second input signals RFINP and RFINN, which are converged to the reference voltage Vref, may be short-circuited (S530). For example, referring to FIG. 4C, after time t1, the header signal may be enabled, and the switching unit 350 may close the switch in order to short-circuit the first and second nodes a and b, and therefore, the voltage levels of the first and second input signals RFINP and RFINN may be more rapidly converged to the reference voltage Vref. If the header signal is not enabled, the switching unit 350 may continue to converge the voltage levels of the first and second input signals RFINP and RFINN to the reference voltage Vref while the first and second nodes a and b are open, i.e., not short-circuited (S540).

Figure 6:
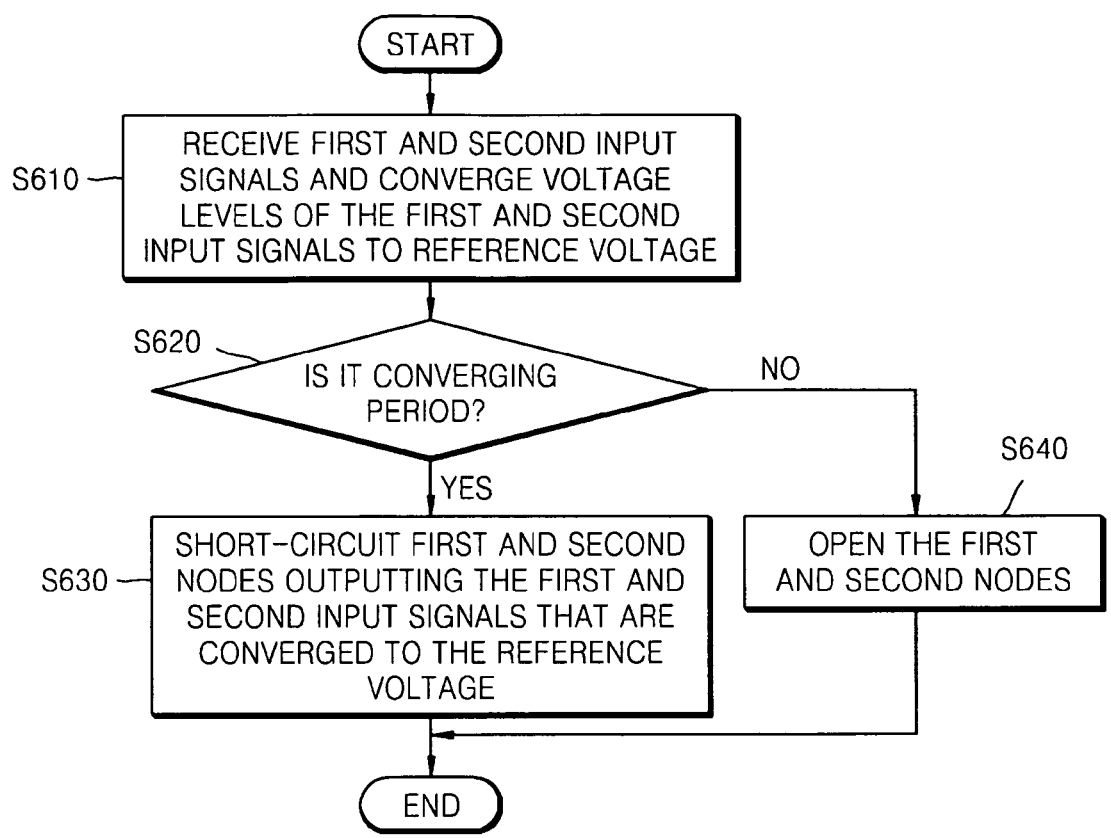
FIG. 6 is a flowchart of a method of converging a voltage of an optical recording medium according to another example embodiment.

FIG. 6 is a flowchart of a method of converging a voltage of an optical recording medium according to another example embodiment. Referring to FIGS. 3, 4, and 6, the apparatus 300 for converging the voltage of the optical recording medium may receive the first and second input signals RFINP and RFINN and converge voltage levels of the first and second input signals RFINP and RFINN to the reference voltage Vref (S610). During the converging of the first and second input signals RFINP and RFINN, e.g., during the operation (S610), the apparatus 300 for converging the voltage of the optical recording medium may determine if a converging period during which the voltage levels of the first and second input signals RFINP and RFINN are being converged to the reference voltage Vref is occurring or if the voltage levels of the first and second input signals RFINP and RFINN have been completely converged to the reference voltage Vref (S620). If the converging period is occurring, e.g., a period between time t1 and time t3 as illustrated in FIG. 4C, the first and second nodes a and b that respectively output the first and second input signals RFINP and RFINN, which are converged to the reference voltage Vref, may be short-circuited (S630). For example, during the period between time t1 and time t3, the switching unit 350 may close the switch to short-circuit the first and second nodes a and b, and therefore, the voltage levels of the first and second input signals RFINP and RFINN may more rapidly converge to the reference voltage Vref. If the converging period is not occurring, e.g., a period before time t1 or a period after time t3, the first and second nodes a and b may be open, i.e., not short-circuited (S640). It will be obvious to those of ordinary skill in the art that the apparatus 300 for converging the voltage of the optical recording medium need not converge the voltage levels of the first and second input signals RFINP and RFINN to the reference voltage Vref at periods other than the converging period, and therefore, at periods other than the converging period the first and second nodes a and b need not be short-circuited and/or an the operation of the apparatus 300 for converging the voltage of the optical recording medium need not be influenced.

As described above, a method and apparatus for converging voltage levels of a plurality of input signals to a reference voltage according to an example embodiment may more quickly converge DC voltage levels of input signals to a desired, or alternatively, a predetermined reference voltage without increasing chip size or making driving a current more difficult.

Although example embodiments have been shown and described in this specification and figures, it would be appreciated by those skilled in the art that changes may be made to the illustrated and/or described example embodiments without departing from their principles and spirit.

What is claimed is:

1. An apparatus for converging voltages of an optical recording medium, the apparatus comprising:
   a first converging unit configured to converge a voltage level of a first input signal to a reference voltage;
   a second converging unit configured to converge a voltage level of a second input signal to the reference voltage; and
   a switching unit configured to determine whether to short-circuit output terminals of the first and second converging units during a period when the voltage levels of the first and second input signals are being converged to the reference voltage,
   wherein the switching unit is configured to determine whether to short-circuit the output terminals in response to a header signal of the optical recording medium.

2. The apparatus of claim 1, wherein the switching unit is configured to short-circuit the output terminals of the first and second converging units if the header signal is enabled.

3. The apparatus of claim 1, wherein the header signal is a variable frequency oscillator (VFO) signal.

4. The apparatus of claim 1, wherein
   the first converging unit is configured to converge the voltage level of the first input signal from among a plurality of input signals to the reference voltage; and
   the second converging unit is configured to converge the voltage level of the second input signal from among the plurality of input signals to the reference voltage.

5. The apparatus of claim 4, wherein the switching unit is configured to determine whether to short-circuit the output terminals in response to a header signal of the optical recording medium.

6. The apparatus of claim 5, wherein the switching unit is configured to short-circuit the output terminals of the first and second converging units if the header signal is enabled.

7. The apparatus of claim 5, wherein the header signal is a variable frequency oscillator (VFO) signal.

8. The apparatus of claim 4, wherein, before the voltage levels of the first and second input signals are converged to the reference voltage, a difference value between the voltage level of the first input signal and the reference voltage has an opposite polarity to and has the same magnitude as a difference value between the voltage level of the second input signal and the reference voltage.

9. The apparatus of claim 4, wherein the first converging unit comprises:
   a first capacitive element having a first end to which the first input signal is applied and a second end to which the output terminal of the first converging unit is connected; and
   a first resistive element having a first end to which the reference voltage is applied and a second end to which the second end of the first capacitive element and the output terminal of the first converging unit are connected.

10. The apparatus of claim 4, wherein the second converging unit comprises:
   a second capacitive element having a first end to which the second input signal is applied and a second end to which the output terminal of the second converging unit is connected; and
   a second resistive element having a first end to which the reference voltage is applied and a second end to which the second end of the second capacitive element and the output terminal of the second converging unit are connected.

11. The apparatus of claim 4, wherein the switching unit is a switch.

12. The apparatus of claim 4, wherein the voltage levels of the first and second input signals are DC voltage levels.

13. The apparatus of claim 4, wherein the first and second converging units are high pass filters (HPFs).

14. A method of converging voltage levels of a plurality of input signals of an optical recording medium, the method comprising:
   converging voltage levels of a first input signal and a second input signal from among the plurality of input signals to a reference voltage;
   determining if a header signal of the optical recording medium is enabled; and
   if the header signal of the optical recording medium is enabled, short-circuiting a first node and a second node configured to output the first and second input signals being converged to the reference voltage.

15. The method of claim 14, further comprising:
   if the header signal is disabled, opening the first and second nodes.

16. The method of claim 14, wherein the header signal is a variable frequency oscillator (VFO) signal.

17. The method of claim 14, wherein, before converging the voltage levels of the first and second input signals to the reference voltage, a difference value between the voltage level of the first input signal and the reference voltage has an opposite polarity to and has the same magnitude as a difference value between the voltage level of the second input signal and the reference voltage.

18. The method of claim 14, wherein the voltage levels of the first and second input signals are DC voltage levels.

19. A method of converging voltage levels of a plurality of input signals of an optical recording medium, the method comprising:
   converging voltage levels of a first input signal and a second input signal from among the plurality of input signals to a reference voltage;
   determining a converging period during which the voltage levels of the first and second input signals are converging to the reference voltage; and
   if a current period is the converging period, short-circuiting a first node and a second node configured to output the first and second input signals.

20. The method of claim 19, further comprising:
   if the current period is not the converging period, opening the first and second nodes.

* * * * *